United States Patent Office 3,214,484
Patented Oct. 26, 1965

3,214,484
PRODUCTION OF OLIGOMERS OF 1,3-DIENES
Dietmar Wittenberg, Mannheim, and Herbert Mueller, Ludwigshafen (Rhine), Gartenstadt, Germany, assignors to Badische Anilin- & Soda-Fabrik Aktiengesellschaft, Ludwigshafen (Rhine), Germany
No Drawing. Filed Aug. 7, 1961, Ser. No. 129,569
Claims priority, application Germany, Aug. 18, 1960, B 59,015
4 Claims. (Cl. 260—666)

This invention relates to a process for the production of oligomers of 1,3-dienes in the presence of a catalyst. More specifically, the invention relates to a process for the production of oligomers of 1,3-dienes in which a catalyst solution is used.

The term "oligomers" as used in this specification is intended to include open-chain or cyclic compounds in which the molecule is made up of a small number of 1,3-diene molecules. These oligomers may contain for example two to ten 1,3-diene molecules and have boiling points up to about 150° C. at $10^{-7}$ mm. Hg.

It is known that aluminum alkyls or alkyl aluminum chlorides and chromium or titanium halides can be used for the production of catalyst systems with the aid of which 1,3-dienes can be converted into unsaturated cyclic hydrocarbons, such as cyclododecatriene-(1,5,9) or cyclooctadiene-(1,5). In oligomerizations of this kind, non-distillable partly rubber-like high molecular weight polymers are obtained as byproducts. These polymers swell in the solvents used and convert the reaction mixture into a highly viscous mass which is difficult to handle and makes a continuous operation of the process impossible. Another disadvantage of the known methods resides in the fact that readily flammable and air-sensitive organo-aluminum compounds are necessary. Moreover, the yields, and especially the space-time yields, are unsatisfactory.

It has also been proposed to use catalyst systems prepared from a titanium compound, a reducing metal and a metal halide compound, the metal being aluminum and/or the metal halides being an aluminum compound. These catalyst systems, such as are described in the copending patent applications Serial Nos. 15,844 and 81,268, filed March 18, 1960, and January 9, 1961, both of which are now abandoned, respectively, by Herbert Mueller, do not lead to rubber-like byproducts nor is it necessary to use readily flammable catalyst components, but even with these catalyst systems there remains the difficulty, which is very troublesome especially in continuous operation of the process, that catalyst suspensions have to be used as in all known cases.

These suspensions cannot be conveyed with the usual metering pumps and moreover, by reason of the different specific gravities of the components of the catalyst, they tend to separate, so that no uniform catalyst composition and catalyst activity is ensured. In the withdrawal of the reaction mixture, stoppages of the pipes and valves are liable to occur on account of the suspended catalyst particles. Hitherto catalyst suspensions have been used exclusively. The catalysts used have either been present as suspensions from the start or a suspension was formed when the catalyst components were mixed. In all known catalyst systems for the oligomerization of 1,3-dienes, heterogeneous catalysis has been used and consequently the above-mentioned difficulties have occurred. Moreover, considerable amounts of catalyst components have had to be used because the reaction appears to proceed only at the surface of the catalyst.

It is an object of this invention to provide a process in which the oligomerization of 1,3-dienes, especially the production of cyclododecatriene-(1,5,9), is carried out in the presence of a soluble catalyst. It is another object of this invention to provide a process for the oligomerization of 1,3-dienes which is carried out in homogeneous liquid phase. It is a further object of the invention to provide a process for the oligomerization of 1,3-dienes in which very small amounts of catalyst may be used. It is a further object of the invention to provide a process for the oligomerization of 1,3-dienes in which no difficulties occur in metering the catalyst solutions. Finally, it is an object of this invention to provide a process for the oligomerization of 1,3-dienes which is easy to carry out continuously because it proceeds in a homogeneous and low-viscosity phase.

These and other objects are achieved in accordance with this invention in a process for the catalytic production of oligomers of 1,3-dienes with the use of a catalyst system which comprises a titanium compound, a metal having reducing action and, if desired, a halide of an element from Groups IIB, IIIA, IVA and VA of the Periodic System, the reducing metal being aluminum and/or the halide being an aluminum halide, by using as the catalyst system a clear solution of the said catalyst components in an aromatic hydrocarbon or an aromatic hydrocarbon halide. The reducing metals belong to Groups IA, IIA, IIB, IIIA, IVB or VIIB of the Periodic System of elements. The groups of the Periodic System used in the present specification refer to the table reproduced on pages 384 and 385 of the "Handbook of Chemistry and Physics," 39th edition, Cleveland, Ohio. Either the metal must be aluminum or the halide must be an aluminum halide, but it is also possible for the metal to be aluminum and the metal halide to be an aluminum halide; in other words, the presence of aluminum in elementary or combined form is essential.

The active catalyst solutions are obtained by intense mixing. In some cases, heating the catalyst components in the solvent used at about 50° to 200° C. for several hours is advantageous. In the production of these solutions, not only does dissolution of the catalyst components in the physical sense take place but there also occurs a reaction between the catalyst components and the solvent used which is not clearly understood. The solution formed in this way then constitutes the active catalyst solution. It is usual to filter free from undissolved constituents, but any undissolved constituents may be left in the catalyst solution. The term "catalyst solution" is intended to convey that the bulk of the catalyst components is clearly dissolved in the solvent in question, i.e., that the content of solid substances suspended in the solvent is less than 10%.

The activity of such a catalyst solution may be intensified and the yield of lower liquid oligomers increased by co-employing a substance which forms complexes with metal halides and/or by co-employing an organo-aluminum compound.

By the new process there are formed in high yields, with reference to the 1,3-diene used, mainly cyclic trimers of the initial material and also small amounts of cyclic dienes, such as 1,5-cyclo-octadiene and 4-vinylcyclohexene-(1). These substances are called lower oligomers. There are also formed in small amounts oligomers of higher molecular weight which are in part liquid but in part waxy and of good solubility in the usual solvents. Rubber-like insoluble polymers are formed only in negligible amounts, if at all.

By using a catalyst solution according to this invention, a considerably higher space-time yield is achieved than in the methods hitherto known. In the new process only small amounts of catalyst are required, which moreover are very cheap. The new process is easy to carry out continuously. Owing to the low concentration of catalyst, the product is easy to work up.

Suitable titanium compounds are titanium (IV) acid esters, titanium halides, titanium (IV) ester halides and organotitanium halides. Of the titanium (IV) acid esters those are preferred which are derived from saturated aliphatic or cycloaliphatic alcohols with 1 to 10 carbon atoms. Such esters include titanium tetramethylate, titanium tetraethylate, titanium tetrapropylate, titanium tetraoctylate, titanium tetracyclohexylate and titanium tetracyclo-octylate.

The titanium halides are derived from trivalent or tetravalent titanium. For example titanium (III) chloride, titanium (III) bromide, titanium (IV) fluoride, titanium (IV) iodide, titanium (IV) bromide and titanium (IV) chloride are suitable.

Titanium (IV) chloride is by far the preferred titanium compound by reason of its ready accessibility.

Titanium (IV) ester halides are derived on the one hand from the said halides, especially the chlorides, and on the other hand from paraffin alcohols and cycloparaffin alcohols with 1 to 10 carbon atoms. Examples are diethoxy titanium dichloride, triethoxy titanium monochloride and tricyclohexyl titanium monochloride.

Organotitanium halides may also be used, i.e., compounds in which halogen as well as one to three organic radicals, preferably alkyl radicals with one to four carbon atoms, are attached to the titanium by way of a titanium-carbon linkage. Methyl titanium (IV) trichloride is an example of these compounds. It is also possible to use organotitanium halides which are combined with metal halides to form a complex, as for example $C_6H_5TiCl_2 \cdot AlCl_3$ and $C_6H_5TiCl_2 \cdot 2AlCl_3$.

Of the reducing metals of Groups IA, IIA, IIIA, IIB, IIIB (including the lanthanides), IVB and VIIB, it is preferred to use: lithium, sodium, potassium, beryllium, magnesium, calcium, strontium, barium, boron, aluminum, gallium, indium, thallium, zinc, cadmium, titanium, zirconium, cerium and manganese. Alloys or mixtures of two or more of the said metals may sometimes be used with advantage. The metals are conveniently used in not too compact a form, for example in the form of metal powder or granules with grain size diameters between about 0.01 and 2 mm.

Of the halides, the chlorides and bromides are preferred. Iodides may also be used with good results. Suitable compounds include boron trichloride, aluminum chloride, aluminum bromide, aluminum iodide, gallium bromide, indium chloride, thallium chloride, carbon tetrachloride, silicon tetrachloride, tin tetrachloride, zinc chloride, zinc iodide, cadmium chloride, phosphorus trichloride and antimony trichloride. Mixtures of the halogen compounds may obviously also be used.

The relative proportions of the substances used for the production of the catalyst may vary within wide limits. The molar ratio of titanium compound to reducing metal advantageously lies between 2:1 and 1:300; the molar ratio of reducing metal to metal halide may lie between 1:5 and 3:1. The level of titanium compound may however be increased to above that of the other components. The relative proportions of the catalyst components may be used to influence the composition of the reaction products. Thus, without metal halide or with small amounts of metal halide, mainly cyclic trimers of the initial material are obtained whereas an increase in the level of metal halide results in increased formation of compounds of higher molecular weight. The catalyst need only be used in small amounts with reference to the 1,3-diene. Thus the reaction proceeds satisfactorily even with an amount of catalyst of 0.2% by weight with reference to the diene to be reacted.

For the preparation of the catalyst solution, the said catalyst components are dissolved in an aromatic hydrocarbon or an aromatic hydrocarbon halide. Suitable solvents have boiling points between about 80° and 300° C. Thus benzene, toluene, o-xylene, m-xylene, p-xylene, ethylbenzene, isopropylbenzene, 2,4-methyl-ethylbenzene, mesitylene, tetrahydronaphthalene and cumene may be used. Suitable aromatic hydrocarbon halides contain one or two halogen atoms, especially chlorine or bromine atoms. Examples are: chlorobenzene, bromobenzene, iodobenzene, o-chlorotoluene, m-chlorotoluene, p-chlorotoluene, o-bromotoluene, m-bromotoluene, p-bromotoluene, 2-chloronaphthalene and o-dichlorobenzene.

These solutions may be prepared by simple mixing in an inert gas atmosphere, for example in nitrogen or a rare gas. At room temperature, dissolution in many cases proceeds very slowly. It is therefore necessary as a rule to effect intense mixing, for example in a ball or vibratory mill. It is therefore advantageous in most cases to carry out mixing at an elevated temperature, for example between about 50° and 200° C. The optimum period and the favorable mixing temperature depend on the catalyst components used. It is also possible to first intensely mix only one or two components of the catalyst system and add the third component later. The weight ratio of catalyst components to solvent should lie between 1:0.5 to 1:30. The processes which take place during this dissolution are not known but it may safely be assumed that there is not only a physical dissolution because the metallic components also pass into solution. The solutions obtained, which contain titanium in trivalent form, are advantageously freed from small amounts of undissolved constituents by decantation, centrifuging or filtration. The clear solutions then obtained are used according to this invention for the oligomerization of 1,3-dienes. The undissolved constituents which have been separated may be co-employed for the preparation of further catalyst solution.

By adding substances which form complexes with the metal halide components of the catalyst, it is often possible to increase the level of low molecular weight, especially trimeric, cyclic oligomers. Suitable substances are those which can fill up any electron gaps of the central atoms of the halogen compounds which may be present. When a halogen compound the central atom of which has a filled-up electron shell is used for the reaction, the complex-forming substance must be capable of saturating the central atoms co-ordinatively.

Suitable complex-forming compounds of the said kind include the salts of alkali and alkaline earth metals, in particular their halides, hydrides and their salts derived from fatty acids with 1 to 4 carbon atoms, as well as compounds of oxygen, nitrogen, phosphorus and sulfur containing a single electron pair, such as ethers, thioethers, sulfoxides, amines, amine oxides, organic phosphines and phosphine oxides. The structure of the organic additives is not critical. The only requirements are that, besides the groups characteristic of the said classes of substances (—O—, —N—, O=N—, P—, O=P—, —S— or O=S), they should either have hydrocarbon structure or contain one or more additional atoms or groups which are attached to carbon atoms and which are inert under the conditions of the process. Such atoms and groups include halogen atoms attached to an aromatic ring as well as carbonyl, carboxy, cyano and carbalkoxy groups.

The preferred alkali and alkaline earth salts are halides, hydrides, cyanides and salts of lower fatty acids with 1 to 4 carbon atoms.

Primary, secondary and tertiary amines are suitable for use as additives. They may contain aliphatic, cycloaliphatic, araliphatic and/or aromatic radicals. The amine nitrogen may also form part of a heterocyclic ring which may contain one or two further hetero atoms, for example oxygen, nitrogen or sulfur. Suitable amines include methylamine, dimethylamine, trimethylamine, butylamine, dicyclohexylamine, stearylamine, cyclo-octylamine, cyclododecylamine, aniline, N-methylaniline, N,N-dimethylaniline, benzylaniline, β-phenylethylaniline, naphthylamine, pyridine, quinoline, piperazine, oxazoline, thiazole and carbazole.

The amine oxides, ethers, thioethers, sulfoxides, organic phosphines and phosphine oxides which are suitable for use as additives may also contain aliphatic, cycloaliphatic, araliphatic and/or aromatic radicals. The characteristic atom (—NO, —S—, —OP—) may also form part of a heterocyclic ring. Suitable compounds of the said kind include trimethylamine oxide, dimethylaniline oxide, diethyl ether, diphenyl ether, anisole, p-chloroanisole, glycolic acid methyl ester methyl ether, glycolic acid nitrile methyl ether, dibutyl ether, tetrahydrofurane, dioxane, diphenylene oxide, diethyl sulfide, diphenyl sulfide, dibenzyl sulfide, dimethyl sulfoxide, diphenyl sulfoxide, dibenzyl sulfoxide, triphenylphosphine, triethylphosphine, triphenylphosphine oxide, thiomorpholine and 1,4-dithiacyclohexane.

For practical reasons, those amines, amine oxides, ethers, thioethers, sulfoxides, organic phosphines and phosphine oxides are preferred which in addition to the groups characteristic of the said classes have only hydrocarbon structure and contain up to 20 carbon atoms.

It is of course also possible to add two or more of the said additives at the same time or to use compounds which contain two or more of the said characteristic groups and which thus are, for example, an amine and a thioether at the same time, such as phenothiazine.

Organo-aluminum compounds of the formula AlRR'R" may also be used as additives, R denoting an alkyl radical with 1 to 8 carbon atoms or an aryl radical with 6 to 12 carbon atoms, R' and R" an alkyl radical with 1 to 8 carbon atoms, an aryl radical with 6 to 12 carbon atoms, an alkoxy radical with 1 to 10 carbon atoms or an aryloxy radical with 6 to 12 carbon atoms, a halogen atom, such as fluorine, chlorine, bromine, iodine, as well as hydrogen. Examples of such compounds are: aluminum triorganyls, such as aluminum triethyl, aluminum tripropyl, aluminum tri-isobutyl, aluminum trihexyl, aluminum tri-octyl, aluminum triphenyl, aluminum tritolyl, aluminum tri-p.tert.-butylphenyl, aluminum tribenzyl, aluminum triphenylethyl, the diorganyl-aluminum hydrides, such as diethyl aluminum hydride or di-isobutyl aluminum hydrides, organyl aluminum halides, such as diethyl aluminum chloride, di-isobutyl aluminum chloride, phenyl aluminum dichloride, ethyl aluminum sesquichloride, phenyl aluminum sesquichloride, ethyl aluminum dichloride, butyl aluminum dichloride or phenyl aluminum dichloride, dialkoxy aluminum alkyls, such as diethoxy aluminum ethyl or dipropoxy aluminum ethyl, alkoxy aluminum dialkyls, such as ethoxy aluminum diethyl, propoxy aluminum diethyl, octoxy aluminum diethyl, or phenoxy aluminum diphenyl, and also alkoxyalkyl aluminum halides, such as ethyl ethoxy aluminum chloride and propyl ethoxy aluminum chloride.

Mixtures of such compounds may also be used and at the same time complex-forming compounds of the above-mentioned kind may be added; in other words, complex-forming compounds may be used alone, or organo-aluminum compounds may be used alone, or complex-forming compounds and organo-aluminum compounds may be added simultaneously.

The molar ratio in which the additives may be added advantageously lie between 1:10 and 5:1 with reference to the total of the titanium compound and metal halide. Moreover when using organo-aluminum compounds as additives, the molar ratio of the total of aluminum compound dissolved in the catalyst solution and organo-aluminum compound of the additive to the dissolved titanium compound should be greater than or equal to 2.

The additives may be added during the preparation of the catalyst solution, but they may also be added after the preparation of the catalyst solution.

The catalyst solutions in the said aromatic solvents may be used directly for oligomerization.

It is however possible to dilute them further by adding inert solvents, for example saturated aliphatic or cycloaliphatic hydrocarbons, especially of the boiling range of 50° to 300° C., such as n-heptane, iso-octane, cyclohexane, methylcyclohexane and cyclooctane. In general, such an amount of solvent is used that the aromatic solvent used for the production of the catalyst and any aliphatic or cycloaliphatic diluent added is 0.05 to 5 times that of the 1,3-diene. The amount of active catalyst components, i.e., the titanium compound, the reducing metal and the metal halide—without additives—is usually up to 20% by weight with reference to the total solution.

Oligomerization of the 1,3-dienes may be carried out within a wide temperature range, namely between about −50° and +150° C. The preferred reaction temperature lies between 20° and 100° C. The reaction according to the new process is as a rule carried out under atmospheric pressure, but it is also possible to work under reduced or increased pressure. Especially when using low boiling point initial materials and elevated reaction temperatures, increased pressures, for example up to 10 atmospheres, are often necessary.

The 1,3-diene is introduced in gaseous or liquid phase into the catalyst solution obtained in the manner described, polymerization then commencing with considerable evolution of heat. The desired reaction temperature is maintained by appropriate supply of initial material and, if necessary, by external cooling. To complete the reaction, the temperature is preferably maintained for some time after the supply of 1,3-diene has been discontinued. The catalyst is then destroyed, for example by careful addition of a small amount of water or an alcohol, such as methanol or ethanol, or by adding a large amount of acetone to the reaction mixture, small amounts of high molecular weight polymers being separated. When the catalyst is destroyed with alcohol or water, it is recommendable previously to add to the mixture a small amount of another substance which contains a lone electron pair. Ketones, ethers, ammonia, amines, acid amides, esters and sulfides are for example suitable for this purpose. After decomposition of the catalyst, the mixture is worked up in the usual way, for example by distillation or by extraction with water and distillation of the organic phase after it has been separated from the aqueous phase.

Because of the extremely low catalyst concentration it is sometimes unnecessary to destroy the catalyst by hydrolysis or alcoholysis. The reaction mixture may rather be directly worked up by distillation.

The process may be carried out most advantageously in continuous operation, for example in a heated tube at one end of which the catalyst solution and the 1,3-diene are supplied continuously and simultaneously. The tube may be so dimensioned that the residence period is sufficient to achieve practically quantitative conversion of the diene. In most cases, residence periods of 10 to 200 minutes are sufficient. The reaction mixture, which leaves at the other end of the tube, is supplied to a continuously operating distillation column, if desired after decomposition of the catalyst.

The invention is illustrated by, but not limited to, the following examples in which parts are parts by weight.

*Example 1*

A catalyst solution is prepared from 15 parts of aluminum chloride, 5 parts of aluminum grit, 26 parts of titanium tetrachloride and 150 parts of benzene by stirring for 30 hours at 80° C. 10 parts of the clear solution thus obtained and 90 parts of benzene are introduced under an argon atmosphere into an agitated vessel fitted with a thermometer, reflux condenser and gas inlet pipe. Then butadiene is charged in a powerful stream while stirring, the mixture rapidly warming up. The temperature is kept between 65° and 75° C. by cooling with ice-water. Within 20 minutes, 206 parts of butadiene is absorbed. Stirring is continued for 30 minutes and then 5 parts of isopropanol is added. By distilling the mixture, 138 parts of cyclododecatriene-(1,5,9), i.e., 76% of the theory is obtained as well as about 56 parts of higher molecular weight butadiene polymers which are however still soluble in acetone and which remain as a residue together with the catalyst residue.

*Examples 2 to 15*

The catalyst solution is prepared as in Example 1, but immediately before the butadiene is charged, an additive is supplied to the reaction solution. A procedure analogous to that in Example 1 is then followed.

| Example | Additive | Yield of cyclododecatriene-(1,5,9) with reference to reacted butadiene (in percent) | Yield of soluble butadiene oligomers in percent |
|---|---|---|---|
| 2 | 0.5 part of sodium chloride | 82 | 15 |
| 3 | 1 part of diphenyl sulfide | 96 | 3 |
| 4 | 3 parts of phenyl aluminum sesquichloride | 85 | 13 |
| 5 | 2 parts of diethyl aluminum chloride | 87 | 12 |
| 6 | 0.5 part of triethyl aluminum | 90 | 9 |
| 7 | 0.5 part of diethyl aluminum hydride | 94 | 5 |
| 8 | 0.2 part of tetrahydrofurane | 91 | 7 |
| 9 | 0.1 part of dimethyl-sulfoxide | 86 | 10 |
| 10 | 0.5 part of diphenylamine | 87 | 10 |
| 11 | 0.1 part of triethylamine oxide | 85 | 12 |
| 12 | 1.0 part of triphenyl-phosphine | 88 | 11 |
| 13 | 1.0 part of triphenyl-phosphineoxide | 95 | 3 |
| 14 | 0.5 part of diethyl-ethoxy-aluminum | 76 | 18 |
| 15 | 3 parts of phenyl aluminum and 1 part of triphenyl-phosphineoxide | 96 | 3 |

*Example 16*

A catalyst solution is prepared from 2.7 parts of aluminum grit and 13 parts of titanium tetrachloride by grinding for 5 hours in 90 parts of benzene and then heating for 5 hours at 80° C. 50 parts of the solution separated from excess solid constituents is diluted with 180 parts of benzene. Butadiene is introduced into this solution in a powerful stream. In the course of one hour 400 parts of butadiene is reacted. The yield of cyclododecatriene-(1,5,9) is 304 parts, i.e., 76% of the theory. Analogous results are obtained by using toluene, alkylbenzene or m-xylene as the solvent instead of benzene.

*Example 17*

For the preparation of a catalyst solution, 2.7 parts of aluminum grit and 0.3 part of aluminum chloride are ground for 3 hours, then heated with 165 parts of chlorobenzene first for 24 hours and, after addition of 0.5 part of titanium trichloride, for a further 2 hours at 130° C. The undissolved constituents are then allowed to settle. 110 parts of the clear solution thus obtained, which contains 0.09% of titanium dissolved in trivalent form, react with about 1000 parts of butadiene per hour at 65° to 75° C. By working up, cyclododecatriene-(1,5,9) is obtained in a 93% yield besides 6% of soluble butadiene oligomers of higher molecular weight.

*Example 18*

A catalyst solution is prepared as described in Example 17. 50 parts of isoprene is dripped into a mixture of 90 parts of benzene and 25 parts of the catalyst solution at a temperature of 75° C. within a period of two hours and the whole is stirred at this temperature for a further three hours. Working up of the solution gives 23.5 parts of liquid isoprene oligomers having a boiling point of 70° to 100° C./0.1 mm. Hg ($n_D^{25}$=1.5040) and 12 parts having a boiling point of 100° to 160° C./0.1 mm. Hg. 12 parts of a benzene-soluble resin remains as a distillation residue.

*Examples 19 to 29*

Catalyst solutions are prepared by heating the catalyst components in 180 parts of benzene at 80° C. for 24 hours. The undissolved catalyst constituents are filtered off. Butadiene is introduced into the clear solutions obtained at a temperature of from 60° to 70° C. By working up, cyclododecatriene-(1,5,9) is obtained in the yields given in the following table:

| Example | Catalyst components | Yield of cyclododecatriene-(1, 5, 9) with reference to reacted butadiene |
|---|---|---|
| | | *Percent* |
| 19 | 27 parts AlCl$_3$ / 2.2 parts Be / 17 parts TiCl$_4$ | 73 |
| 20 | 27 parts AlCl$_3$ / 2.3 parts Mg / 17 parts TiCl$_4$ | 75 |
| 21 | 53 parts AlCl$_3$ / 4.0 parts Ca / 17 parts TiCl$_4$ | 71 |
| 22 | 27 parts AlCl$_3$ / 7.0 parts Zn / 17 parts TiCl$_4$ | 83 |
| 23 | 27 parts AlCl$_3$ / 4.8 parts Ti / 9.5 parts TiCl$_4$ | 59 |
| 24 | 27 parts AlCl$_3$ / 11 parts Mn / 17 parts TiCl$_4$ | 75 |
| 25 | 40 parts AlCl$_3$ / 7.8 parts K / 19 parts TiCl$_4$ | 66 |
| 26 | 2.5 parts ZnCl$_2$ / 5.4 parts Al / 17.0 parts TiCl$_4$ | 71 |
| 27 | 7.5 parts CCl$_4$ / 5.4 parts Al / 14.0 parts TiCl$_4$ | 68 |
| 28 | 11.0 parts SnCl$_4$ / 5.4 parts Al / 17 parts TiCl$_4$ | 75 |
| 29 | 4.5 parts PCl$_3$ / 5.4 parts Al / 17 parts TiCl$_4$ | 63 |

The catalyst solutions such as are used in Examples 19 to 29 may be modified by additives in a similar manner as in the Examples 2 to 15. Cyclododecatriene-(1,5,9) is then obtained in yields of up to 96%.

*Example 30*

3 parts of activated aluminum and 60 parts of chlorobenzene are heated at 130° C. for 24 hours while stirring and after the addition of 40 parts of benzene and 2 parts of titanium tetraethylate are heated for another 5 hours at 80° C. Butadiene is introduced into the filtered catalyst solution at 60° to 70° C. for three hours. By working up, 1280 parts of cyclododecatriene-(1,5,9), with reference to the butadiene introduced, is obtained. This is a yield of 93% of the theory.

*Example 31*

1.14 parts of titanium tetrachloride, 2 parts of aluminum and 2 parts of aluminum chloride are ground in a vibratory mill in 90 parts of benzene. The resultant suspension is mixed with 0.7 part of finely ground sodium chloride and stirred for 15 minutes. The undissolved catalyst constituents are then separated and 140 parts of gaseous butadiene is led into the catalyst solution at 50° C. during a period of 20 minutes. After allowing the reaction to proceed for another hour the catalyst is decomposed with a little ether/methanol mixture. Upon distillation of the reaction mixture, 122 parts (88% of the theory) of cyclododecatriene-(1,5,9) (B.P. 110° C., $n_D^{20}$=1.5076) is obtained. 15 parts of a waxy polybutadiene remains as a distillation residue in the distillation flask.

We claim:

1. In a process for the catalytic production of oligomers of 1,3-dienes from 1,3-dienes in which a catalyst is used which has been obtained from:

(a) a titanium compound selected from the group consisting of titanium IV acid esters, titanium halides, titanium IV ester halides and organo titanium halides, (b) a metal selected from the group consisting of the metals of Groups IA, IIA, IIB, IIIA, IVB and VIIB of the periodic system of elements, and (c) a halide of an element selected from the group consisting of the elements of Groups IIB, IIIA, IVA and VA of the periodic system, at least one of the components (b) and (c) being selected from the class consisting of aluminum metal and aluminum halides, the improvement comprising dissolving the bulk of these catalyst components in a solvent selected from the group consisting of an aromatic hydrocarbon and an aromatic hydrocarbon halide such that the total amount of said catalyst components remaining as solid substances in the solution is less than 10% and carrying out said process with the dissolved catalyst components.

2. In a process for the catalytic production of oligomers of 1,3-dienes from 1,3-dienes in which a catalyst is used which has been obtained from:

(a) a titanium compound selected from the group consisting of titanium IV acid esters, titanium halides, titanium IV ester halides and organo titanium halides.

(b) a metal selected from the group consisting of the metals of Groups IA, IIA, IIB, IIIA, IVB and VIIB of the periodic system of elements, and (c) a halide of an element selected from the elements of Groups IIB, IIIA, IVA and VA of the periodic system, at least one of the components (b) and (c) being selected from the class consisting of aluminum metal and aluminum halides, the improvement which comprises dissolving the bulk of these catalyst components in a solvent selected from the group consisting of an aromatic hydrocarbon and an aromatic hydrocarbon halide such that the total amount of said catalyst components remaining as solid substances in the solution is less than 10% and carrying out said process with the dissolved catalyst components in the presence of a substance which forms complexes with the metal halide components of the catalyst.

3. In a process for the catalytic production of oligomers of 1,3-dienes from 1,3-dienes in which a catalyst is used which has been obtained from:

(a) a titanium compound selected from the group consisting if titanium IV acid esters, titanium halides, titanium IV ester halides and organo titanium halides, (b) a metal selected from the group consisting of the metals of Groups IA, IIA, IIB, IIIA, IVB and VIIB of the periodic system of elements, and (c) a halide of an element selected from the group consisting of the elements of Groups IIB, IIIA, IVA and VA of the periodic system, at least one of the components (b) and (c) being selected from the class consisting of aluminum metal and aluminum halides, the improvement which comprises dissolving the bulk of these catalyst components in a solvent selected from the group consisting of an aromatic hydrocarbon and an aromatic hydrocarbon halide such that the total amount of said catalyst components remaining as solid substances in the solution is less than 10% and carrying out said process with the dissolved catalyst components, and coemployment of an organo-aluminum compound of the formula AlRR'R" in which R denotes a member selected from the group cosisting of alkyl radicals with 1 to 8 carbon atoms and aryl radicals with 6 to 12 carbon atoms, R' and R" each denotes a radical selected from the group consisting of alkyl radicals with 1 to 8 carbon atoms, aryl radicals with 6 to 12 carbon atoms, alkoxy radicals with 1 to 10 carbon atoms, aryloxy radicals with 6 to 12 carbon atoms, halogen atoms and hydrogen atoms.

4. In a process for the catalytic production of oligomers of 1,3-dienes from 1,3-dienes in which a catalyst is used which has been obtained from:

(a) a titanium compound selected from the group consisting of titanium IV acid esters, titanium halides, titanium IV ester halides and organo titanium halides, (b) a metal selected from the group consisting of the metals of Groups IA, IIA, IIB, IIIA, IVB and VIIB of the periodic system of elements, and (c) a halide of an element selected from the elements of Groups IIB, IIIA, IVA and VA of the periodic system, at least one of the components (b) and (c) being selected from the class consisting of aluminum metal and aluminum halides, the improvement which comprises dissolving the bulk of these catalyst components in a solvent selected from the group consisting of an aromatic hydrocarbon and an aromatic hydrocarbon halide such that the total amount of said catalyst components remaining as solid substances in the solution is less than 10% and carrying out said process with the dissolved catalyst components in the presence of a substance which forms complexes with the metal halide components of the catalyst and in the presence of an organo-aluminum compound of the formula AlRR'R" in which R denotes a member selected from the group consisting of alkyl radicals with 1 to 8 carbon atoms and aryl radicals with 6 to 12 carbon atoms, R', and R" each denotes a radical selected from the group consisting of alkyl radicals with 1 to 8 carbon atoms, aryl radicals with 6 to 12 carbon atoms, alkoxy radicals with 1 to 10 carbon atoms, aryloxy radicals with 6 to 12 carbon atoms, halogen atoms and hydrogen atoms.

References Cited by the Examiner

UNITED STATES PATENTS 3,149,174  9/64  Mueller _____ 260—666

FOREIGN PATENTS 1,095,819  12/60  Germany.
1,106,758  5/61  Germany.
1,109,674  6/61  Germany.

DELBERT E. GANTZ, *Primary Examiner.*

MILTON STERMAN, ALPHONSO D. SULLIVAN,
*Examiners.*